United States Patent [19]

Thomas

[11] 4,016,986
[45] Apr. 12, 1977

[54] CLOSURE SYSTEM
[75] Inventor: Paul M. Thomas, Paradise Valley, Ariz.
[73] Assignee: Builders Equipment Co., Phoenix, Ariz.
[22] Filed: Apr. 14, 1975
[21] Appl. No.: 567,531
[52] U.S. Cl. ................. 214/16.4 A; 214/16.4 C; 214/18 R; 212/4; 49/464; 110/177
[51] Int. Cl.² .............. F26B 3/18; B65G 1/06
[58] Field of Search ............ 214/16.4 R, 16.4 A, 214/18 R; 110/176, 177; 432/250; 425/445; 49/136, 207, 464, 198; 160/214, 188; 312/304, 306, 308, 312; 296/3, 24 R, 24 A, 24 B, 24 C; 212/4

[56] References Cited
UNITED STATES PATENTS

| | | | |
|---|---|---|---|
| 593,266 | 11/1897 | Wright | 49/198 |
| 1,157,124 | 10/1915 | Ruble et al. | 160/88 X |
| 3,298,546 | 1/1967 | Jones | 110/177 X |
| 3,492,704 | 2/1970 | Schwellenbach | 214/16.4 A |

Primary Examiner—Albert J. Makay

[57] ABSTRACT

An end closure system for selectively opening and closing at least one preselected guideway in a treatment chamber. The end closure system includes a plurality of vertically aligned panels, each having opposite ends slidably engaged in vertically disposed guide means. Connecting means are provided on each panel for raising or lowering a preselected panel and any panel above a preselected panel to provide access to the preselected guideway or guideways or to seal the guideway or guideways. In one embodiment of the invention lifting means are provided for engaging the connecting means on the preselected panel to raise and lower the preselected panel and any panels above the preselected panel.

3 Claims, 5 Drawing Figures

CLOSURE SYSTEM

This invention relates generally to treatment chambers and more particularly concerns kilns such as are employed in the curing of concrete blocks, and in particular to an end closure construction for a kiln having a plurality of vertically and horizontally aligned guideways for storing concrete blocks during curing.

Certain kilns for curing concrete blocks generally include a pair of vertical side walls and a roof structure which are adapted to enclose the blocks being cured. A plurality of elongated guideways, parallel to the side walls, are provided for supporting the green blocks during curing. The guideways are arranged in a grid pattern in horizontally aligned layers and vertically aligned tiers. The blocks are fed onto one end of the guideways and are discharged at the other end after curing. In order to maintain the atmosphere in the kiln, the infeed and discharge ends of the kiln are provided with closures to prevent heat and/or moisture from escaping during the curing operation.

Various types of end closures have been used in kilns of this type to permit feeding the blocks into and removing the blocks from the guideways. Removable panels have been placed over the entire ends of the kiln. Other end closures have employed long, removable panels which cover one or more vertical tiers of guideways. In both of these constructions, relatively large areas of the kiln are opened to the ambient atmosphere when the blocks are inserted into or removed from the kiln allowing the escape of the atmosphere therefrom so as to decrease the efficiency of the operation.

It is therefore the principal object of the present invention to provide an end closure system for a treating chamber such as a kiln which restricts the opening of the kiln to a minimum and which is compatible with modern infeed and discharge operations.

It is another object of the invention to provide an end closure system for a block kiln having vertically slidable door panels to prevent interference with the infeed and discharge means. It is further an object of the invention to provide lifting means for opening preselected panels in the end closures.

Other objects and advantages of the invention will become apparent from the following description including the drawings in which.

In general, an end closure system in accordance with the broadest aspects of the invention is adapted for selectively opening and closing at least one preselected guideway in a treatment chamber. Such an end closure system includes a plurality of vertically aligned panels, each having opposite ends slidably engaged in vertically disposed guide means. Preferably, as illustrated, each panel is proportioned to close the area of one guideway. Connecting means are provided on each panel to enable the raising or lowering of a preselected panel together with each panel above the preselected panel to provide access to a preselected guideway or guideways or to seal that guideway or guideways. Another aspect of the invention is the provision of lifting means for engaging the connecting means on a preselected panel to raise and lower the preselected panel and any panels above the preselected panel.

Figure 2:
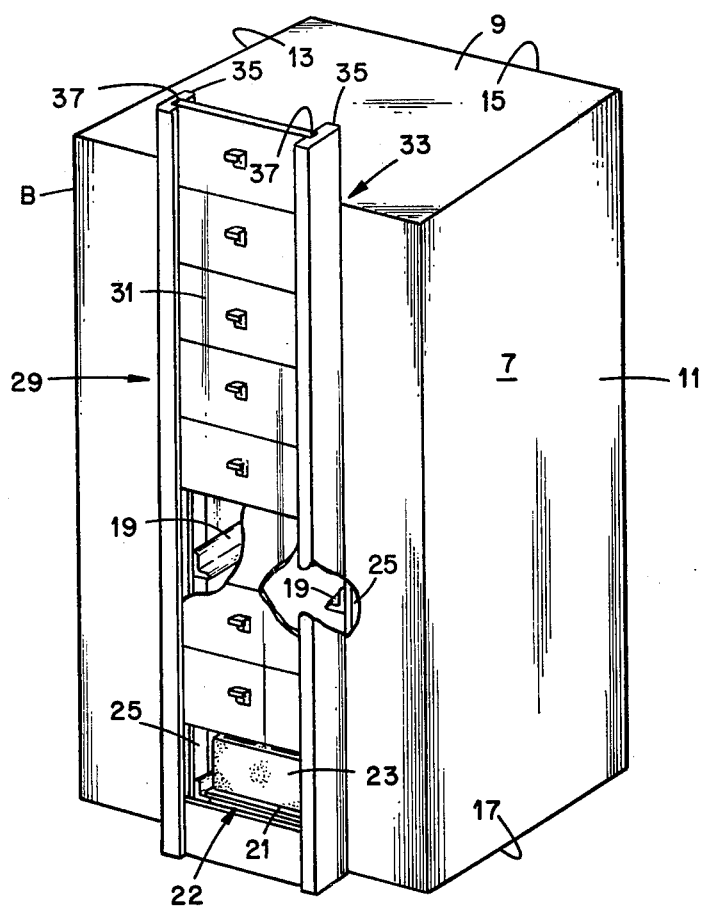
FIG. 2 is a perspective view of a single tier kiln having an end closure embodying various of the features of the invention.

Referring to the drawings, the treatment chamber 7 illustrated in FIG. 2 comprises an end closure of generally rectangular configuration and includes a top wall 9, opposed side walls 11 and 13 and a rear wall 15. The chamber 7 is provided with a base 17 supportingly engaging the lower ends of the walls 11, 13 and 15. In the illustrated embodiment, spaced apart guideways 22 are aligned in superposed layers, as illustrated, to receive and support pallets 21 for concrete blocks 23 or the like. The guideways 22 each include a pair of guideway rails 19 which are supported on a pair of front guideway posts 25 at the infeed 33 of the chamber 7 and a pair of rear guideway posts (not shown). Each of the guideway rails 19 are parallel to the other of the pair and are spaced apart to receive the pallets 21 or the like.

Figure 3:
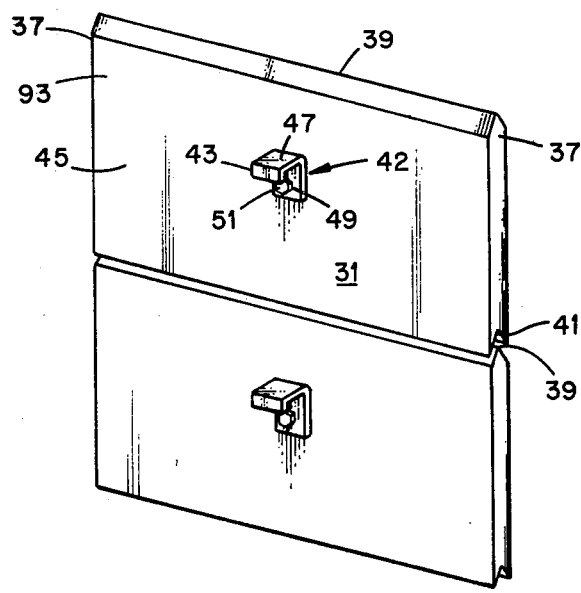
FIG. 3 is a perspective view of details of the end closure panels which constitute a part of the kilns shown in FIGS. 1 and 2.

An end closure system generally referred to as 29 is provided at the infeed end of the chamber 7, as shown in FIG. 2. The illustrated end closure system 29 includes a plurality of vertically aligned panels 31 which in the aggregate are proportioned to cover the infeed end 33 of the chamber 7. The panels 31 are slidably mounted in spaced apart vertical guide means 35 positioned adjacent the guideway posts 25. The illustrated panels 31 are generally rectangular and are positioned so that each panel covers the end of one of the guideways 22. The opposite side margins 37 of each panel 31 are slidably mounted for vertical movement in the vertical guide means 35. In order to provide a seal between the panels 31, their mating edges are nested. As shown, the upper edge 39 of each panel, is V-shaped and nests in the V-shaped groove 41 on the lower edge of the adjacent panel as shown in FIG. 3. The described construction provides a seal which minimizes passage of gases or moisture.

In order that a panel 31 may be raised to open a selected guideway 22, each of the panels 31 is provided on its outer face 45 with a connecting means 42 which may be employed to raise a panel either manually or mechanically. The connecting means 42 illustrated includes the hook-shaped lugs 43 which are rigidly mounted on the forward face 45 of each panel 31 by bolts 51, or the like, as shown in FIG. 3. The lugs 43 each include a downwardly opened hook portion 47 and a web portion 49 having an opening therethrough for receiving a bolt 51.

When any preselected panel is raised it provides coverage for the end of the guideway immediately above the guideway originally covered by the preselected panel. In order to prevent disengagement of the uppermost panel and the guide means 35 when one of the panels is raised the guide means 35 extend above the top wall 9 of the treatment chamber 7 to receive the uppermost panel (e.g. see uppermost panel 31 in FIG. 2). In operation, after the material to be treated is inserted into a guideway, the preselected panel is released and the preselected panel, and any panels above the preselected panel, will return to the closed position under the force of gravity. This process may be repeated until the treatment chamber is filled. After treatment is complete, the panels may again be raised for removing material from the infeed end of the guideways.

While the illustrated embodiment discloses panels proportioned to cover one guideway end, panels adapted for covering more than one guideway may be used.

Figure 1:
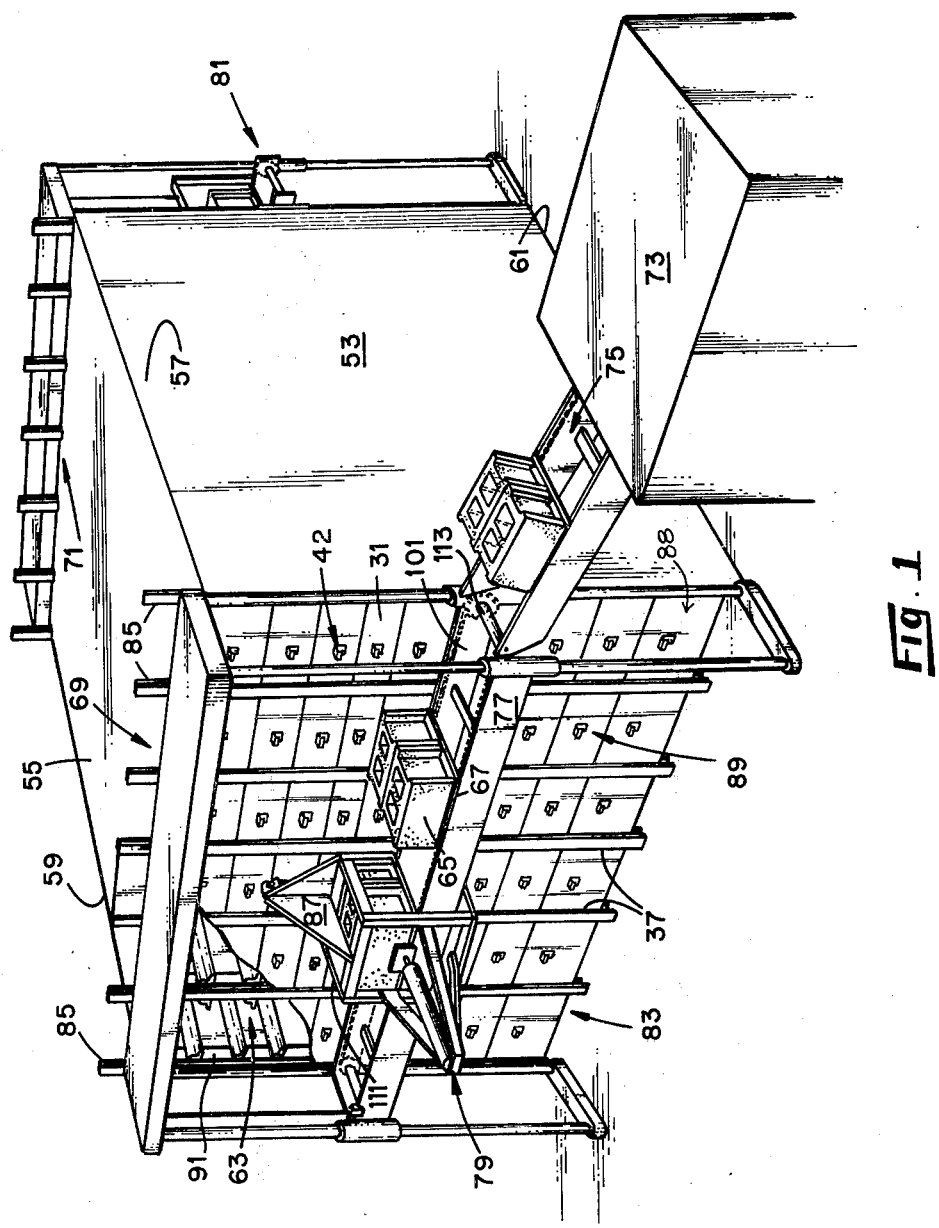
FIG. 1 is a perspective view of a high capacity block kiln having an end closure system embodying various of the features of the invention.
Figure 4:
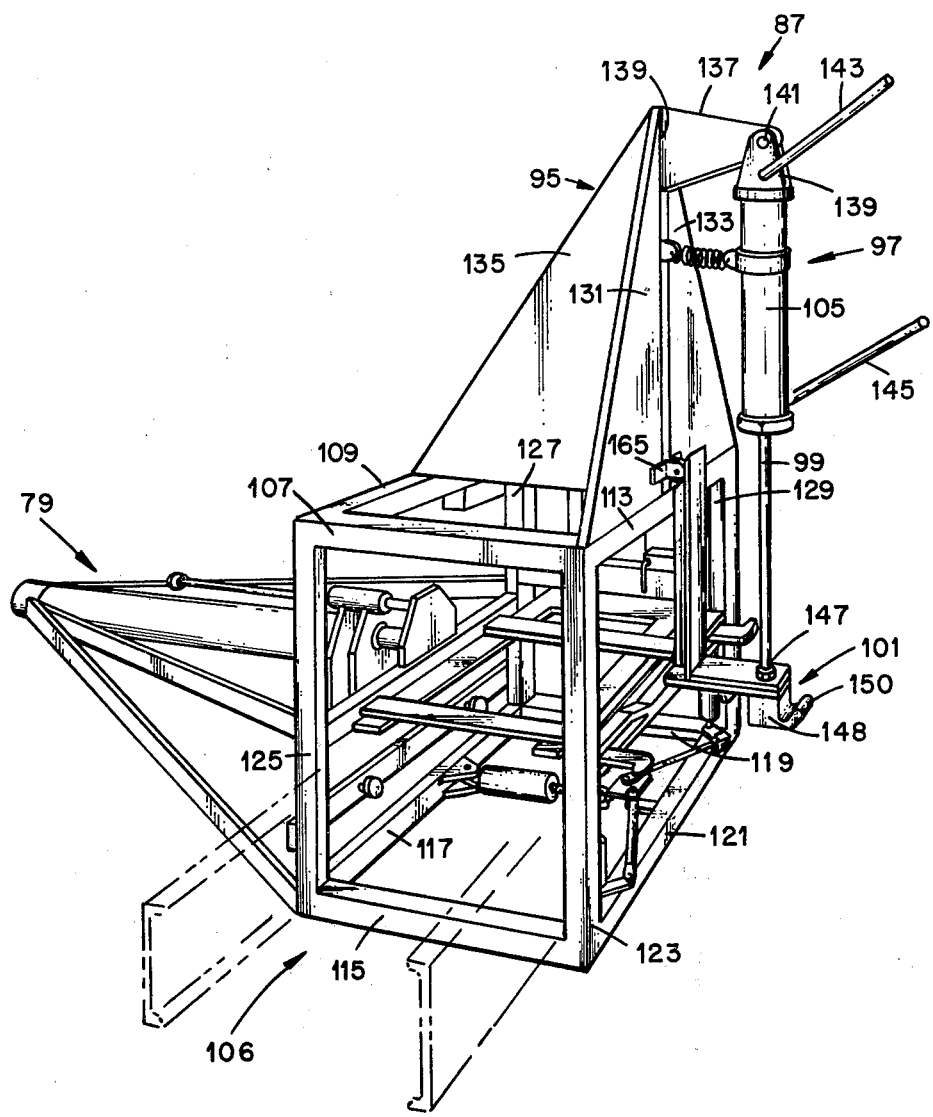
FIG. 4 is a perspective view of panel lifting means which is embodied in the kiln illustrated in FIG. 1.

In FIGS. 1, 3 and 4 there is illustrated the use of end closures and a lifting mechanism employing various features of this invention installed on a commercial concrete block kiln. While the features of this invention have application to various types of block kilns, it is illustrated in the drawings in connection with a kiln of the type shown in Schwellenbach U.S. Pat. No. 3,492,704. In order that the description is clear, the general structure of Schwellenbach will be described in the following paragraphs and, in the event that a more complete description is required reference may be had to that patent which is incorporated herein by reference.

The kiln 53 is of a generally rectangular configuration and includes a top wall 55 and opposed side walls 57 and 59 supported at their lower ends on a base 61. A grid pattern of guideways 63 extends from one end of the kiln 53 to the other, blocks 65 on pallets 67 being fed in at the infeed end 69 (the forward end of FIG. 1) and being removed from the discharge end 71 (the rearward end in FIG. 1).

In the general operation of the kiln 53, green blocks 65 are fed from a block making machine 73 to a supply conveyor 75 which is connected to an infeed conveyor 77. The infeed conveyor 77 is raised and lowered to a preselected height by a series of chains or cables actuated by a hydraulic piston as described in U.S. Pat. No. 3,492,704. In order that the supply conveyor 75 is adjustable to different heights, its discharge end is pivotally connected to the infeed conveyor 77.

A block pushing means 79 is mounted on the infeed conveyor 77 and is movable therealong so as to be positioned adjacent the infeed end 69 of a preselected guideway.

The green blocks 65 are conveyed on a pallet 67 into alignment with the preselected guideway 63 by the infeed conveyor 77. The block pushing means 79 is then actuated to push the pallet 67 and the blocks 65 it carries into the guideway 63. Pallets are fed into the guideway 63 until the entire length of the guideway 63 is filled. The process is then successively repeated in different guideways until the entire kiln 53 is filled.

When the curing process is complete, the block pusher 79 is again positioned adjacent the infeed end 69 of a preselected guideway 63 and the discharge conveyor 81, mounted at the discharge end 71 of the kiln 53, is simultaneously positioned adjacent the opposite end of the same guideway 63. As a pallet 67 carrying green blocks 65 is pushed into the infeed end 69 of the guideway 63 a pallet carrying cured blocks is pushed onto the discharge conveyor 81, through the action of the abutting block laden pallets aligned in the guideway. The green blocks are pushed into the preselected guideway and the cured blocks are pushed from the guideway onto the discharge conveyor, until the guideway is filled with green blocks, the cured blocks having been discharged and conveyed to a storage area. The infeed conveyor 77 and block pusher 79 together with the discharge conveyor 81 are then positioned adjacent the opposite ends of another guideway and the process is repeated until the cured blocks have been discharged from the kiln 53 and that guideway is filled with green blocks.

Since the infeed and discharge ends of the kiln shown in Schwellenbach U.S. Pat. No. 3,492,704 are open during charging, heat and moisture are lost during the loading and discharging operations. In order to minimize the heat and moisture loss, an end closure system 83 is provided at the infeed end 69 and the discharge end 71 of the kiln 53 as shown in FIG. 1. The illustrated end closure system 83 is compatible with modern block loading and discharging mechanisms and enables continuous operation of the kiln 53 by reducing the interior area of kiln 53 exposed to the ambient atmosphere during loading and unloading operations.

The illustrated end closure systems 83 are mounted adjacent the infeed end 69 and the discharge end 71 of the kiln 53. Each closure system 83 includes a plurality of vertically aligned panels 31 which register with one of the guideways 63 and which are slidably supported in vertically disposed guide means 85. Lifting means 87 for raising and lowering a preselected one of the panels 31 and any panel above the preselected panel are supported on the infeed conveyor 77 and the discharge conveyor 81.

The illustrated end closure system 83 includes a plurality of tiers 89 of vertically aligned panels 31, the tiers 89 being arranged in side-by-side relationship to define horizontally aligned layers 88. The plurality of tiers 89, in the aggregate, are proportioned to cover the infeed end 69 of the kiln 53. An end closure system (not shown), similar to the end closure 83, is adapted to close the discharge end 71 of the kiln 53. As pointed out above, the panels 31 are slidably mounted in spaced apart vertical guide means 85 positioned adjacent guideway supporting posts 91. In the illustrated embodiment the vertical guide means 85 are H-shaped and adapted for slidably receiving the ends of abutting tiers 89 of panels 31.

The panels 31 in the illustrated end closure system 83 are of the same construction as the panels 31 which have been described in connection with the treatment chamber 7. In short, each is generally rectangular and proportioned to cover the end of one of the guideways 63. The opposite side margins 37 of each panel 31 are slidably mounted for vertical movement in the vertical guide means 85. In order to provide a seal between the panels 31, the lower edge 41 of each panel 31 is formed with a V-shaped groove in which the upper edge 39 of the adjacent panel nests, as shown in FIG. 3, which has been previously discussed. The described construction provides a seal which minimizes passage of gases or moisture.

As previously described, each of the panels 31 is provided on its outer face 45 with a connecting means 42 of the type which has been described for raising and lowering a preselected panel together with any panel above the preselected panel.

The panels 31 of the illustrated end closure systems 83 mounted at the infeed end 69 and the discharge end 71 of the kiln 53 are opened by lifting means 87 mounted on and movable along the infeed conveyor 77 and the discharge conveyor 81.

In general, the illustrated lifting means 87 includes a frame 95 which is adapted to support a hydraulic cylinder assembly 97 including a piston rod 99 which terminates in an engaging hook 101 for engaging the connection means 42 on a panel. Cam means 103 is provided to automatically move the engaging hook 101 into engagement with the panel connecting means 42 to raise a preselected panel 31 when the hydraulic cylinder 105 is actuated.

The support frame 95 for the panel lifting means 87 at the infeed end 69 is mounted on the upper portion of the frame 106 for the block pusher 79 which in turn is mounted on and movable along the infeed conveyor 77. The block pusher frame 106, as shown in FIGS. 1 and 4, supports the block pushing means 79 and includes a generally box-shaped configuration which is fabricated from suitable structural members including top members 107, 109, 111 (not shown) and 113, bottom members 115, 117, 119 and 121 and vertical support members 123, 125, 127 and 129. The panel lifting support frame 95 is generally triangular in shape and includes two upright triangular braces 131 and 133 mounted in substantially the same plane on the top member 113 of the block pusher frame 106, i.e. the member adjacent the infeed end 69 of the kiln 53. A third triangular brace 135 is mounted in substantially perpendicular relation with the braces 131 and 133, as shown in FIG. 4 and is connected to the braces 131 and 133 and to the top members 109 and 113. A web 137 is attached at one of its ends 139 to the upper ends of frame members 131, 133, and 135, as shown in FIG. 4. The opposite end of the web 137 is provided with a hole (not shown) into which the hydraulic cylinder assembly 97 is pivotally mounted.

The hydraulic cylinder assembly 97 includes a mounting bracket 139 having a clevis which straddles the opening in the web 137 and is attached thereto by the pin 141. The mounting bracket supports the hydraulic cylinder 105 which includes the piston rod 99 connected to a piston (not shown) which is disposed within the cylinder 105 in the usual manner.

The cylinder 105 and piston rod 99 are proportioned to raise the panels 31 a distance sufficient for inserting blocks 65 into the ends of the guideways 63 and suitable conduits for hydraulic fluid 143 and 145 communicate with a source of hydraulic fluid (not shown). The end 147 of the piston rod 99 is provided with the engaging hook 101 for connecting with the panel connecting means 42 on the face of the panels 31.

The illustrated engaging hook 101 comprises a lug 148 having an upwardly open end 150 which is proportioned to engage the downwardly opened hook-shaped lugs 43 mounted on the forward face 45 of the panels 31.

As pointed out above, cam means 103 is adapted to move the hook 101 into engagement with the panel connecting means 42 for raising the panel 31. The cam means 103 includes a cam member 149 which is strapped on the piston rod 99 by an L-shaped bracket having a pair of legs 151 and 153 arranged at right angles to one another. The leg 151 is rigidly attached to the piston rod 99 at right angles thereto and the other leg 153 extends upwardly from the hook 101. The cam member 149 is attached to the leg 153 and includes a flat cam surface 155 extending along its lower portion and a ramp 157 at its upper end.

Figure 5:
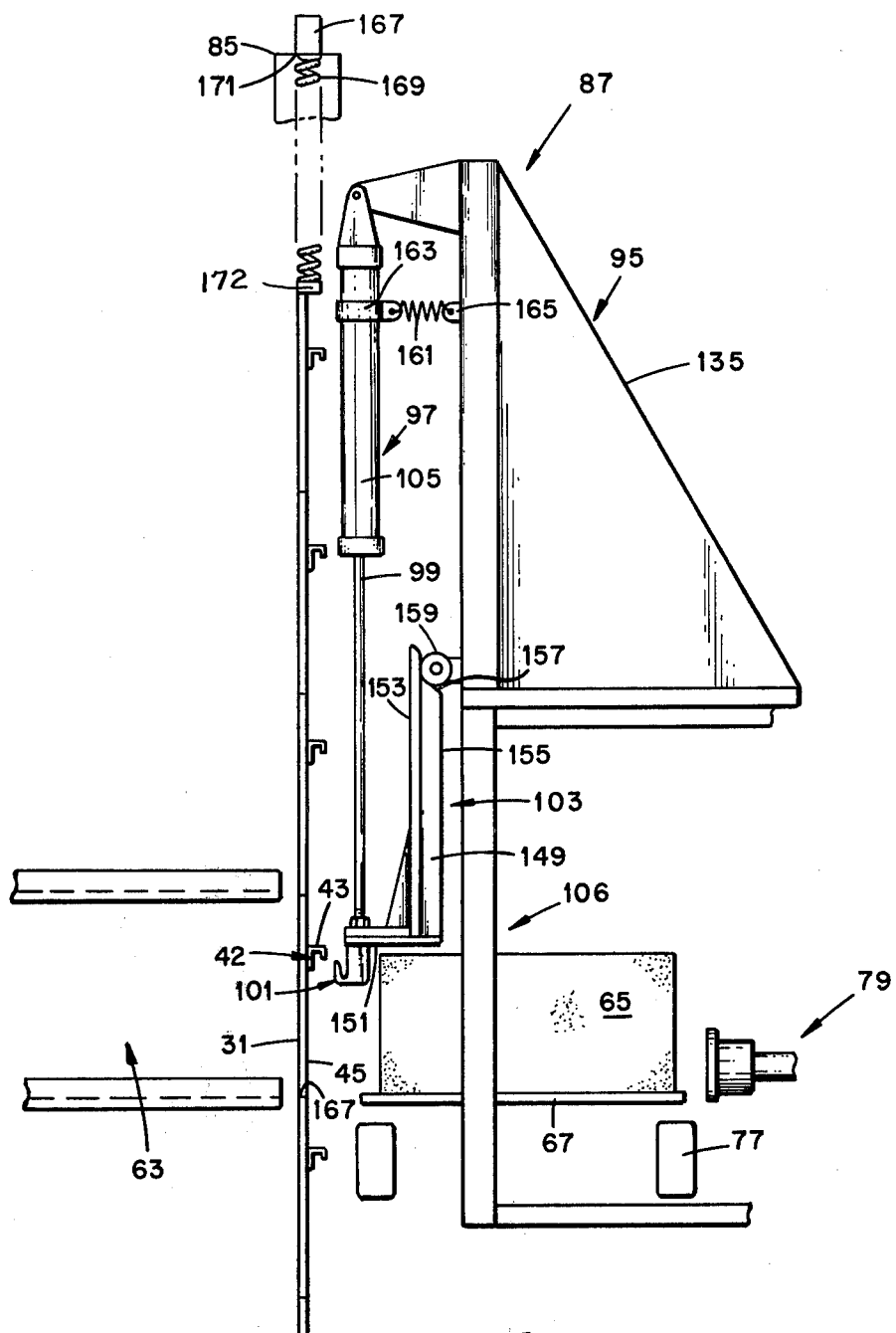
FIG. 5 is a partially schematic, side elevational view of a tier of end closure panels and the panel lifting means shown in FIG. 1.

A cam roller 159 is supported on the lower portion of the triangular braces 131 and 133, as illustrated, and the proportions and position of the cam surface 155 are such that the cam roller 159 rides on the surface of the leg 153 when the piston 99 is in its lowermost position as illustrated in FIG. 5. The leg 153 and/or the cam surfaces 155 and 157 are maintained in engagement with the cam roller 159 by means of the spring 161 which is attached at one of its ends to a collar 163 mounted on the hydraulic cylinder 105 and at the other of its ends to the brackets 165 mounted on the triangular braces 131 and 133. When the piston rod 99 is initially retracted the roller 159 rolls first along the ramp 157 until it reaches the cam surface 155 to advance the hook 101 into engagement with the connecting means 42 on the face 45 of panel 31. The piston rod 99 continues to retract until the panel 31 is raised to provide an opening for the infeed end 69 of the guideway. After the guideway is filled the piston rod 99 is extended, the roller 159 moves along the cam surface 155 until the lower edge 167 of the preselected panel 31 abuts the upper edge of the adjacent lower panel. As the hook 101 is extended farther, the roller 159 again passes along the ramp 157 at the upper end of the elongated cam member 149 and the hook 101 is retracted from below the panel connecting means 42 by the spring 161. In order to raise and lower the panels 31 of the end closure system at the discharge end 71 of the kiln 53 discharge lifting means having the same construction as the lifting means 87 is mounted on a frame, which in turn is mounted on and movable along the discharge conveyor 81.

In one embodiment, a cross member 167 may be mounted at its opposite ends adjacent the upper ends of the guide means 85 as shown in FIG. 5. A compression spring 169 is mounted on the lower surface 171 of the cross member 167 at one of its ends with the opposite end engaging the top 172 of the uppermost panel 31 to urge the vertically aligned panels 31 into the closed position after the lifting means 87 disengages the connecting means 42.

In the loading operation, the infeed panel lifting means 87 is positioned adjacent a preselected panel 31 and the hydraulic cylinder 105 is activated causing the hook 101 carried on the piston rod 99 to raise. As the hook 101 is raised the cam means 103 causes the cylinder 105 to move toward the panel 31 thereby moving the hook 101 under the panel connecting means 42. As the hook 101 is raised farther, the hook 101 engages the panel connecting means 42 and raises the preselected panel 31 together with all of the panels above the preselected panel. The block pusher 79 is then activated and pushes the block 65 carried on the pallet 67 into the selected guideway 63. Additional blocks pallets 67 are then conveyed into alignment with the infeed end of the preselected guideway 63 and pushed therein until the guideway is filled. The cylinder 105 is then activated to lower the hook 101 carried on the piston rod 99. As the hook 101 is lowered, the preselected panel 31 is lowered and when the roller 159 moves along the ramp 157 on the cam member 149 the spring 161 cause the cylinder 105 to move toward the lifting means frame 95 and thereby moving the hook 101 from below the connecting means 42 on the face of the panel. The lifting means 87 is then positioned adjacent another panel and the process is repeated until the kiln is filled.

When the curing process is complete, the block pusher 79 carrying the lifting means 87 is again positioned adjacent the infeed end 69 of a preselected guideway 63. The discharge conveyor, carrying the discharge lifting means, is simultaneously positioned adjacent the opposite end of the same guideway. The hydraulic cylinders for the discharge and infeed lifting means are then actuated to raise the preselected panels at the discharge end 71 and infeed ends 69 of the kiln 53. As a pallet 67 carrying green blocks 65 is pushed into the infeed end 69 of the filled guideway a pallet carrying cured blocks is urged onto the discharge conveyor 81 through the action of the abutting block laden pallets aligned in the guideway. The green blocks are pushed into the preselected guideway and the cured blocks are urged from the guideway onto the discharge conveyor, until the guideway is filled with green blocks, the cured blocks having been discharged and transported to a storage area (not shown). The infeed conveyor with the infeed lifting means, and the discharge conveyor and the discharge lifting means are then positioned adjacent the opposite ends of another guideway and the process is repeated until the cured blocks have been discharged from the kiln and the kiln is filled with green blocks.

While a preferred embodiment has been shown and described, it will be understood that there is no intent to limit the invention by such disclosure, but rather, it is intended to cover all modifications and alternate constructions falling within the spirit and scope of the invention as defined in the appended claims.

What is claimed is:

1. In an apparatus for storing pallets of uncured concrete blocks during the curing thereof comprising a kiln having a front infeed and a rear discharge end, a plurality of guideways in said kiln each of which extends from the front end to the rear end of said kiln, each of said guideways being proportioned to receive a series of the pallets being stored, said guideways being arranged in a pattern wherein guideways are disposed in horizontally aligned layers and vertically aligned tiers whereby the ends of said guideways adjacent said infeed and discharge ends are arranged in a grid pattern, infeed means including means to feed pallets of blocks into any selected one of said guideways, discharge means adjacent the discharge end of said kiln, and said discharge means including means for receiving pallets of blocks from any selected one of said guideways, the improvement which comprises:

an end closure for each of the infeed and discharge ends of said kiln, each of said end closures comprising a plurality of vertically aligned panels, vertically disposed guide means for said panels, said guide means being supported adjacent the end of said kiln, said guide means slidably engaging the ends of said panels and supporting said panels in vertical alignment with the end of said kiln, a lifting means, connecting means on each of said panels adapted to provide a connection for said lifting means, means for positioning said lifting device adjacent a preselected panel, and means for actuating said lifting means to engage it with said connecting means on said panel and to raise said preselected panel and panels above said preselected panel whereby said blocks may be inserted into the infeed end of said guideways and said blocks may be withdrawn from the discharge end of said guideways.

2. The apparatus as defined in claim 1 wherein the abutting edges of said vertically aligned panels nest to form a seal whereby gas from within said kiln is prevented from escaping.

3. The apparatus as defined by claim 1 wherein said lifting means includes frame means for movably mounting said lifting means on said infeed means and said discharge means whereby said lifting means is positional adjacent any one of said preselected guideways, hydraulic cylinder means pivotally mounted at the end on said frame means, said hydraulic cylinder means including a cylinder having a piston supported therein and a piston rod connected to said piston, said hydraulic cylinder means means being adapted to raise and lower any one of said preselected panels by at least a distance sufficient to open and close one end of one of said guideways, the other end of said hydraulic cylinder means comprising engagement means adapted to coact with said connecting means mounted on one of said panels, and cam means intermediate said frame and said hydraulic cylinder means for moving said engagement means into proximity with said connecting means when said cylinder is initially actuated to raise one of said panels and to disconnect said engaging means from said connecting means when said hydraulic cylinder means has lowered one of said panels to its closed position.

* * * * *